US006562458B2

(12) United States Patent
Elgelid et al.

(10) Patent No.: US 6,562,458 B2

(45) Date of Patent: May 13, 2003

(54) IRON POWDER AND METHOD FOR THE PREPARATION THEREOF

(75) Inventors: Cecilia Elgelid, Helsingborg (SE); Anne Larsson-Westberg, Helsingborg (SE); Lars-Åke Larsson, Helsingborg (SE)

(73) Assignee: Höganäs AB, Höganäs (SE)

( * ) Notice: Subject to any disclaimer, the term of this patent is extended or adjusted under 35 U.S.C. 154(b) by 129 days.

(21) Appl. No.: 09/759,267

(22) Filed: Jan. 16, 2001

(65) Prior Publication Data

US 2001/0019771 A1 Sep. 6, 2001

(30) Foreign Application Priority Data

Feb. 11, 2000 (SE) .............................................. 0000454

(51) Int. Cl.[7] ......................... B32B 15/00; B32B 15/02; B29B 35/02; B29B 43/02

(52) U.S. Cl. ....................... 428/402; 428/403; 428/407; 264/611; 264/612; 264/613

(58) Field of Search ................................ 428/402, 403, 428/404, 407; 264/611, 612, 613

(56) References Cited

U.S. PATENT DOCUMENTS 5,160,447 A 11/1992 Ishikawa et al. ......... 252/62.54

FOREIGN PATENT DOCUMENTS

| | | | |
|---|---|---|---|
| DE | 1 291 028 | | 3/1969 |
| DE | 34 39 397 | | 10/1984 |
| EP | 0 205 786 | | 4/1986 |
| EP | 0 810 615 | | 12/1997 |
| JP | 06260319 | * | 9/1994 |
| WO | 29490 | | 11/1995 |
| WO | 03622 | | 1/1999 |

* cited by examiner

*Primary Examiner*—Stevan A. Resan

(74) *Attorney, Agent, or Firm*—Burns, Doane, Swecker & Mathis, L.L.P.

(57) ABSTRACT

The invention concerns a process for the preparation of an insulated soft magnetic powder comprising the steps of mixing particles of a soft magnetic iron base powder with an acidic, aqueous insulating-layer forming solution, in which MgO has been dissolved; and drying the obtained mixture to obtain an electrically insulating Mg containing layer on the particle surfaces. The invention also concerns the powder per se as well as compressed soft magnetic powder cores prepared from the powder.

10 Claims, 3 Drawing Sheets

IRON POWDER AND METHOD FOR THE PREPARATION THEREOF

FIELD OF THE INVENTION

This invention relates to a method of providing a thin electrically insulating surface layer on iron powder particles which are to be used for soft magnetic applications. The invention also relates to the powder per se as well as a method concerning compacting and heat treating such powders. Specifically the powders according to the invention are suitable for the preparation of soft magnetic materials for high frequency applications.

BACKGROUND OF THE INVENTION

Iron-based particles have long been used as a base material in the manufacture of structural components by powder metallurgical methods. Magnetic core components have also been manufactured by such powder metallurgical methods, but the iron-based particles used in these methods are generally coated with a circumferential layer of insulating material.

The research in the powder metallurgical manufacture of magnetic core components using coated iron-based powders has been directed to the development of iron powder compositions that enhance certain physical and magnetic properties without detrimentally affecting other properties. Desired properties include a high permeability through an extended frequency range, high pressed strength, low core losses and suitability for compression moulding techniques.

Different types of insulating coatings which are used for particles of iron are disclosed in the literature.

Thus the German patent application 1291028 discloses a method for providing electrical coatings by mixing an iron powder with water including chromic acid and phosphoric acid at an elevated temperature, washing and drying the powder. The iron powder should have a particle size less than 10 μm. The publication does not disclose any magnetic properties for materials prepared by using the iron powder.

Another publication within this field is DE 2 825 235, which discloses an iron powder consisting of particles which are coated with an oxide layer. The particle size is between 0.05 and 0.15 mm and the particles have an oxide coating which, calculated on the particle weight, included 0.3 to 0.8% by weight of oxygen. The oxide coating can be obtained by heating in air or by chemical oxidation, but no process parameters and no analysis of the coated particles are disclosed. From the examples it can be calculated that the permeabilities obtained are in the range of 30 to 35.

The European patent application 434 669 concerns a magnetic powder wherein an electrically insulating coating separates the magnetic powder particles. The particles have an average particle size of 10–300 μm, and the insulating material which covers each of the particles of the magnetic powder comprises a continuous insulating film having a thickness of 10 μm or less and this film comprises a metal alkoxide or a decomposition product thereof.

WO 95/29490 discloses iron powder particles having an insulating layer which is obtained by using an aqueous solution of phosphoric acid and WO 97/30810 discloses extremely thin insulating layers obtained with phosphoric acid in organic solvents.

The DE patent 3 439 397 discloses iron particles which are electrically insulated by a phosphate coating. This coating could be for example magnesium or zinc phosphate and preferably the coating is an iron phosphate coating. The insulating phosphate coating should be between 0.1 and 1.5% of the weight of the iron particles. The preparation of the iron phosphate coating which involves mixing the iron particles with a solution of 89% of phosphoric acid in acetone is disclosed in Example 1. The particles are then compacted and subsequently heated in an oxidising atmosphere. Before the compacting step the phosphate insulated iron particles are optionally mixed with a resin, preferably an epoxy resin. In order to obtain low hysteresis losses heating temperatures above 500° C. and below 800° C. are recommended. Furthermore this heat treatment should preferably be carried out stepwise with alternating reduced and normal or increased pressures and with stepwise increased temperatures for different periods of times. The advantages of this known process are experimentally disclosed for a heat treatment wherein the final step is carried out at a temperature of at least 600° C. Table IV of this patent discloses that the insulating phosphate layers are effective for comparatively low frequencies i.e. frequencies below 1 kHz.

EP 810 615 concerns powder particles enveloped by a insulating phosphate layer. According to this patent the insulating layer is obtained by using a specific phosphating solution, which comprises a solvent and phosphate salts and a rust inhibitor, which is an organic compound containing nitrogen and/or sulphur which has lone pair electrons suppressing the formation of iron oxide and surfactant. This powder is useful for the preparation of soft magnetic materials for high frequency applications.

OBJECTS OF THE INVENTION

An object of the present invention is to provide a new iron based powder, the particles of which are provided with a thin insulating layer.

A second object is to provide a new powder which is specifically suitable for the preparation of soft magnetic materials intended for applications at high frequencies.

A third object is to provide a powder having a high permeability through an extended frequency range and which is resistant to high temperatures.

A forth object is to provide a powder which can be compacted to high densities.

A fifth object is to provide an insulation layer which can be obtained by an environmentally acceptable, energy and time saving process, which does not require the use of organic solvents, toxic metals or special organic additives.

SUMMARY OF THE INVENTION

The new powder is based on the discovery that an effective insulating layer or coating fulfilling the objects above can be obtained if the insulating layer includes a limited amount of magnesium. Such a layer may be obtained by treating an iron base powder with an acid in solvent, preferably water, including magnesium.

The invention also concerns a method of making a component having improved, soft magnetic properties especially at high frequencies, by compacting or die-pressing a powder composition of this insulated iron powder optionally in combination with a thermosetting or thermoplastic resin and subsequently subjecting the compacted composition to heat treatment at a temperature preferably not more than 750° C.

DETAILED DESCRIPTION OF THE INVENTION

Figure 1:
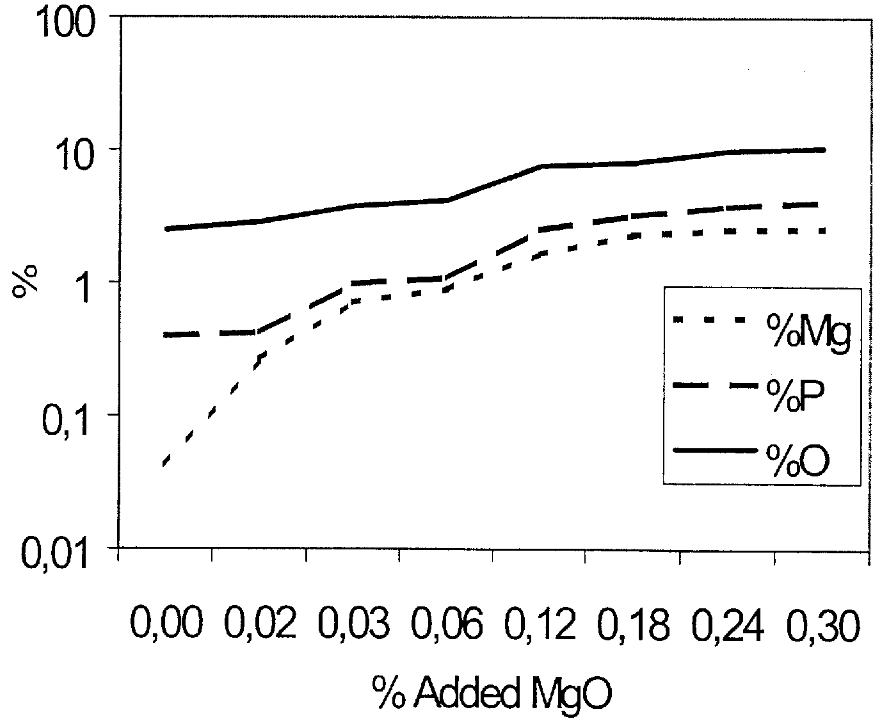
FIG. 1 shows the relationship between the amount of added MgO and the Mg content in the particle surface according to SEM analysis.

The new powder is based on a base powder which preferably consists of essentially pure iron and could be e.g. a commercially available atomised iron powder or a sponge iron powder with round, irregular or flat particles. However, the base powder may also be iron based powders such as Fe—Si alloy, an Fe—Al alloy, permalloy or sendust.

The particle size of the base powder depends on the intended final use of the powder and is generally less than 400 $\mu$m and preferably less than 150 $\mu$m. For higher frequencies particles sizes below 45 $\mu$m are preferred.

The insulating process includes the steps of treating the powder with a solution, preferably an acidic solution, which includes magnesium in an amount corresponding to 0.015–0.3% MgO (i.e. 0.15–3 g) per 1 kg iron powder. Preferably the solution is an aqueous solution, as the solubility of MgO is too small in organic solvents such as acetone. The insulation solution is preferably prepared by dissolving MgO in an acid and a small quantity of water. Preferably the acid is phosphoric acid, although other acids such as nitric acid, may be used. The acid is used in an amount 1–10 ml/kg powder After drying the powder, optionally at an elevated temperature, an analysis discloses that the Mg content of the powder, which is based on essentially pure iron, varies between 0.008 and 0.1% by weight of the total powder for a water atomised powder and between 0.059 and 0.151% by weight for a sponge powder. It is however obvious that the overall Mg content of the insulated powder varies depending on the type and Mg content of the base powder.

The content of Mg in the insulation layer may also be defined by using a SEM technique as follows:

The particles (1500× magnification) were analysed in a Jeol 5800 SEM with the help of EDS (energy dispersive spectrometer). The solid-state detector consisted of an extremely pure single crystal of Germanium, cooled to liquid nitrogen temperature. The x-rays absorbed by the detector generate a number of electron-hole pairs, proportional to the energy of each x-ray quantum. The signal from the detector is further amplified, fed into a multichannel analyser where the pulses are sorted according to their amplitude. The information is presented in an energy diagram where the intensity, i.e. the number of quanta, is plotted versus the quantum energy in keV. Qualitative information is obtained from the position of the peaks in the diagram and quantitative information from the areas under the peaks. Quantification must proceed through several phases: background removal, deconvolution of overlapped peaks and calculation of elemental concentration.

Energy spectra were obtained from point analyses. The penetration depth of the beam was about 3–5 $\mu$m. Quantification was performed using a procedure with ZAF-corrections, i.e. corrections for atom number (Z), absorption (A) and fluorescence (F). The energy scale was calibrated against a Cobalt standard prior to quantification.

According to this technique, which in the following is referred to as SEM analysis, the particle surface of a water atomised iron powder preferably should have an Mg content of 0.04 to 2.6%.

As can be seen from FIG. 1 there is a good correlation between the amount of added MgO and the Mg content in the particle surface according to the SEM analysis.

The present invention also includes a process for the preparation of a compressed soft magnetic powder core comprising the steps of optionally mixing the new powder with a lubricant and/or a thermosetting or thermoplastic resin;

compacting the obtained mixture at a pressure between 300 and 1500 MPa;

heating the compacted body to a temperature between 100 and 750° C. for a period between about 5 and about 60 minutes in inert or oxidising atmosphere;

cooling the annealed body.

The amount of the lubricant may be about 0.1 to 1.0% by weight of the powder and optionally an organic thermosetting or thermoplastic resin may be added before the compacting step. Representative examples of lubricants are Kenolube®, H wax, EBS and stearates, such as zinc stearate. The organic resin could be selected from thermoplastic or thermosetting resins, such as Peracit®, Ultem®.

The compacting could be performed both at ambient and elevated temperatures.

The heating may be performed in air or inert atmospheres. Nitrogen is a preferred atmosphere for obtaining improved magnetic properties especially at high temperatures such as about 700° C. Furthermore, normally the heating is performed in one step.

Magnesium as a constituent of an insulating layer is mentioned in both the German patent 34 39 397 and the EP patent application 810 615 referred to above.

However, in the German patent no examples are disclosed as regards possible and preferred amounts of magnesium in the insulating layer. The only example mentioning magnesium is example 10 according to which magnesium oxide is mixed with the powder before the insulation. This means that the magnesium will be part of the base powder which after annealing to 1200° C. is treated with phosphoric acid in order to get the insulating layer. No insulation effect of a magnesium containing outer layer is disclosed.

The EP patent application 810 615 teaches an insulation layer including magnesium. The layer is obtained from an insulating layer-forming solution including i.a. magnesium. In order to avoid problems with rust however special chemicals have to be added to the insulating layer-forming solution.

According to the present invention it has thus unexpectedly been found that problems with rust can be avoided also without rust inhibitors, boric acid, and/or surfactants such as perfluoroalkyl surfactants, alkylbenzenfulfonic acid surfactants, amphoteric surfactants and polyester surfactants, which are necessary according to the EP publication.

As is demonstrated in the figures it has also been found that critical amounts of magnesium are also necessary in order to achieve good magnetic properties, such as high permeability and frequency stability.

The invention is illustrated by the following examples.

EXAMPLE 1

This example illustrates the effect of the presence of Mg in the insulation layer.

The experiment was performed as follows:

MgO was dissolved in an aqueous phosphoric acid solution and mixed with an iron base powder (a high purity, water atomised iron powder with a particle size <15 μm). The amount of MgO was 0.06% of 1000 g of the iron powder. After drying the powder was mixed with 0.5% Kenolube® and samples were compacted at 800 MPa and heat treated at 400° C. for 30 minutes in nitrogen. A reference powder was prepared from the same base powder but no MgO was added to the acidic aqueous solution.

TABLE 1

| Material | Heat treatment (° C.) | Density g/cm3 | μ at 1 kHz | Dμ% (10–100 kHz) % | Dμ% (10–500 kHz) % |
|---|---|---|---|---|---|
| Reference | 400° C., $N_2$ | 7.29 | 77 | 2.4 | 22 |
| 0.06% MgO | 400° C., $N_2$ | 7.31 | 79 | 1.5 | 14 |

It is obvious that the frequency stability is superior for the new Mg insulated powder.

EXAMPLE 2

This example is intended to illustrate the effect of increasing amounts of Mg as detected by SEM analysis on the permeability at 1 kHz and the Dμ% i.e. the frequency stability in the range 10 kHz-500 kHz.

All samples were compacted at 800 MPa and heat treated at 400° C. for 30 minutes in nitrogen.

Figure 2:
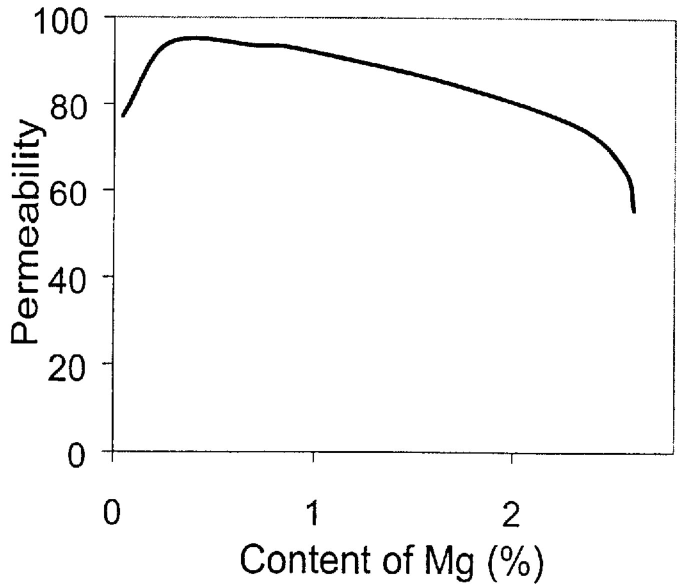
FIG. 2 shows the relationship between the amount of Mg in the insulation layer and permeability.
Figure 3:
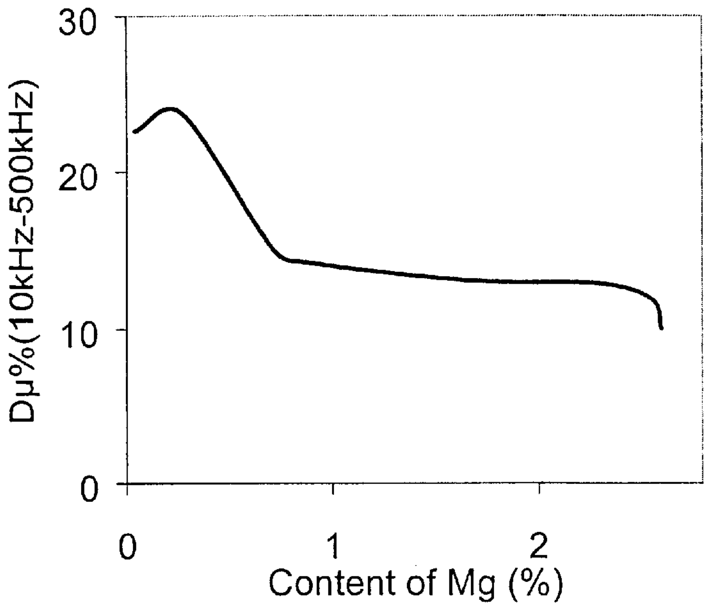
FIG. 3 shows the relationship between the amount of Mg in the insulation layer and frequency stability.

It can easily be seen from FIGS. 2 and 3 that the amounts of Mg in the insulation layer for obtaining improved properties are within narrow limits.

EXAMPLE 3

This example is intended to demonstrate the effect of different particle sizes on the magnetic properties.

All samples according to this example were surface insulated with the addition of 0.06% MgO. After preparation of the powder a lubricant was added in the form of 0.5% Kenolube®. The samples were compacted at 800 MPa and heat treated at 400° C. for 30 minutes in nitrogen.

Table 2 below demonstrates the effect of different particle sizes on the permeability at 1 kHz. The frequency stability Dμ at the intervals 10–100 kHz and 10–500 kHz is also disclosed.

TABLE 2

| Material | Particle Size μm | Density g/cm3 | μ at 1 kHz | Dμ% (10–100 kHz) % | Dμ% (10–500 kHz) % | Mg % by weight |
|---|---|---|---|---|---|---|
| Atomised iron | 400–150 | 7.46 | 77 | 12.8 | 48 | 0.024 |
| Atomised iron | <150 | 7.31 | 75 | 1.4 | 13.2 | 0.030 |
| Atomised iron | <75 | 7.20 | 74 | 0.4 | 3.2 | 0.025 |

TABLE 2-continued

| Material | Particle Size μm | Density g/cm3 | μ at 1 kHz | Dμ% (10–100 kHz) % | Dμ% (10–500 kHz) % | Mg % by weight |
|---|---|---|---|---|---|---|
| Sponge iron | <150 | 7.22 | 83 | 0.7 | 7.9 | 0.08 |

EXAMPLE 4

This example is intended to demonstrate the effect of heat treatment at different temperatures and in different atmospheres on the magnetic properties.

Two samples of an iron base powder were coated with an Mg containing solution to achieve a 0.01% Mg level according to SEM analysis. 0.5% by weight of Kenolube® lubricant was added and the samples were compacted at 800 MPa, and heat treated at temperatures from 300° C. to 800° C. in air or nitrogen.

Figure 4:
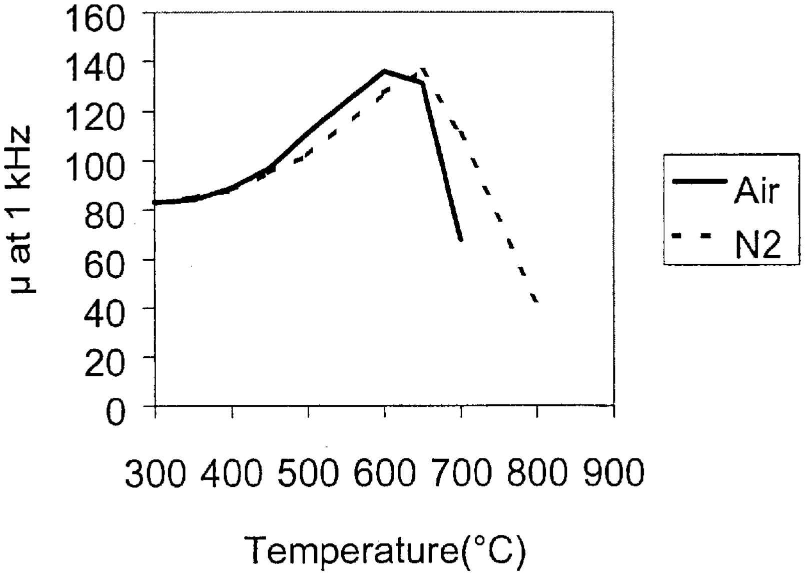
FIG. 4 shows the relationship between treatment temperature and permeability at 1 kHz in air and in nitrogen.
Figure 5:
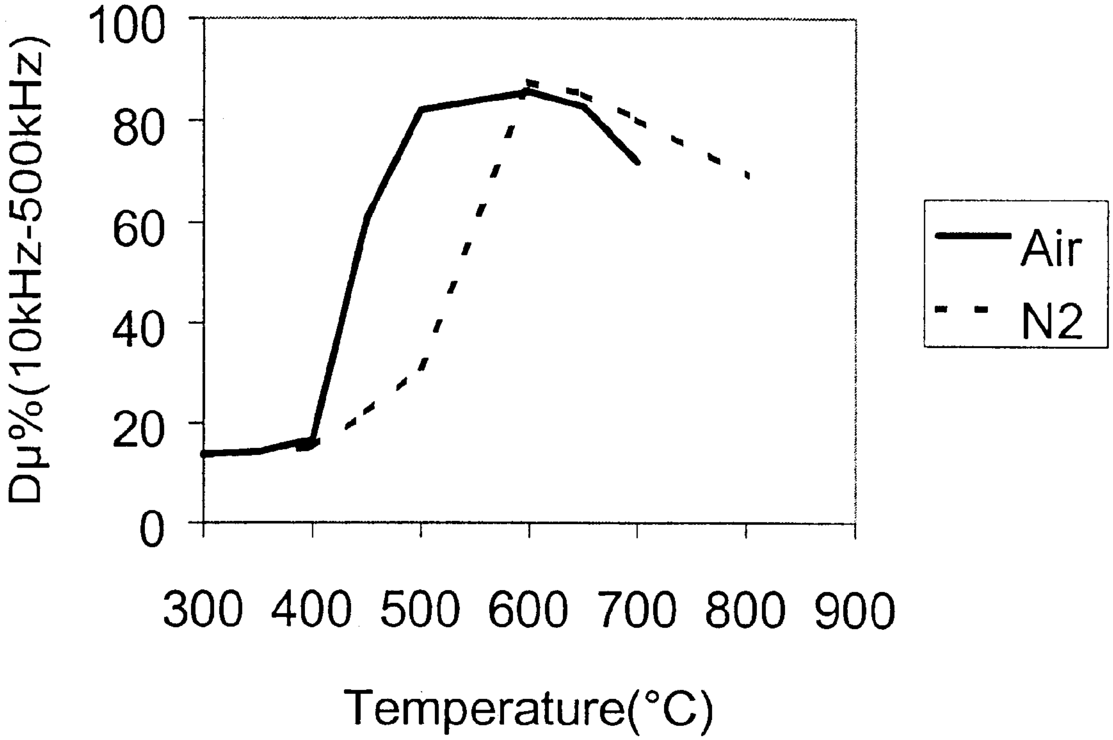
FIG. 5 shows the relationship between treatment temperature and frequency stability in air and in nitrogen.

The effect of the treatment on the permeability at 1 kHz can be seen in FIG. 4 and the effect on the frequency stability Dμ in the 10–500 kHz interval is disclosed in FIG. 5.

What is claimed is:

1. Powder particles consisting of an essentially pure, iron base powder having an electrically insulating layer including Mg, wherein the amount of Mg varies between 0.008 and 0.1% by weight of the powder, when the powder is a water atomised iron powder, and between 0.059 and 0.151% by weight when the powder is a sponge powder, the powder particles being essentially free of boric acid and at least one of rust inhibitors and surfactants selected from the group consisting of perfluoroalkyl surfactants, alkylbenzenfulfonic acid surfactants, amphoteric surfactants and polyester surfactants.

2. Powder particles according to claim 1 wherein the amount of Mg as detected by SEM analysis on the particle surface is between 0.04 and 2.6% by weight for a water atomised iron powder.

3. Process for the preparation of a compressed soft magnetic powder core from the powder particles defined in claim 2, comprising:

optionally mixing the powder particles with a lubricant and/or a thermoplastic or thermosetting resin;

compacting the powder or obtained mixture at a pressure between 300 and 1500 MPa;

heating the compacted body to a temperature between 100 and 750° C. for a period between 5 and 60 minutes in inert or oxidizing atmosphere; and cooling the annealed body.

4. Powder particles according to claim 1, wherein the powder particles are essentially free of rust inhibitors.

5. Powder particles according to claim 1, wherein the powder particles are essentially free of surfactants selected from the group consisting of perfluoroalkyl surfactants, alkylbenzenfulfonic acid surfactants, amphoteric surfactants and polyester surfactants.

6. Powder particles according to claim 1, wherein the powder particles are essentially free of rust inhibitors and surfactants selected from the group consisting of perfluoroalkyl surfactants, alkylbenzenfulfonic acid surfactants, amphoteric surfactants and polyester surfactants.

7. Process for the preparation of a compressed soft magnetic powder core from the powder particles defined in claim 1 comprising:

optionally mixing the powder particles with a lubricant and/or a thermoplastic or thermosetting resin;

compacting the powder or the mixture at a pressure between 300 and 1500 MPa;

heating the compacted body to a temperature between 100 and 750° C. for a period between 5 and 60 minutes in inert or oxidising atmosphere; and cooling the annealed body.

8. Process according to claim 7 wherein the heating is performed in an inert atmosphere.

9. Process according to claim 7, wherein the heating is performed in one step.

10. Process according to claim 9, wherein the heating is performed in an inert atmosphere.

* * * * *